(No Model.)
T. J. SULLIVAN.
ART OF TREATING SMOKE ECONOMICALLY.
No. 335,653. Patented Feb. 9, 1886.
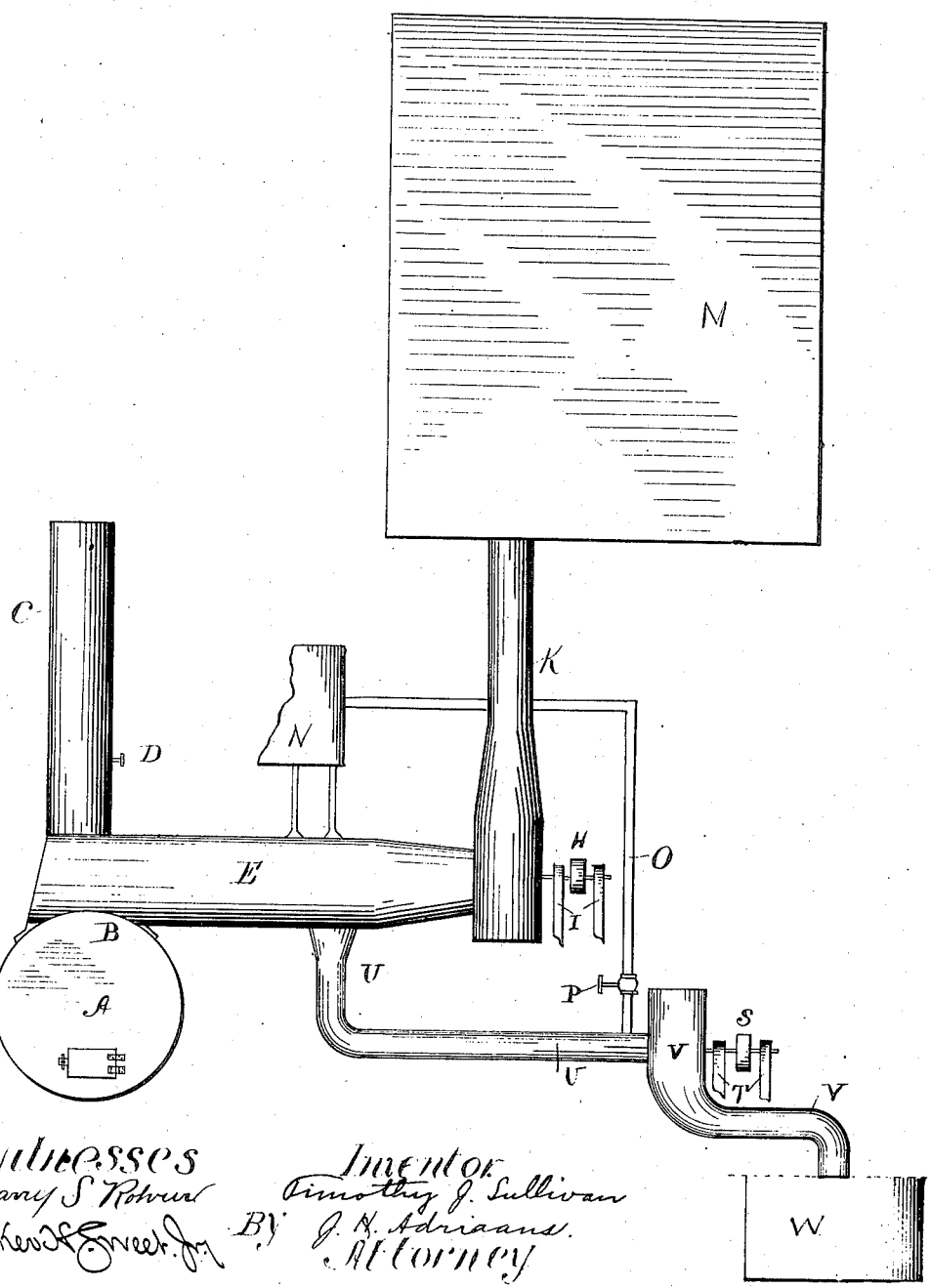

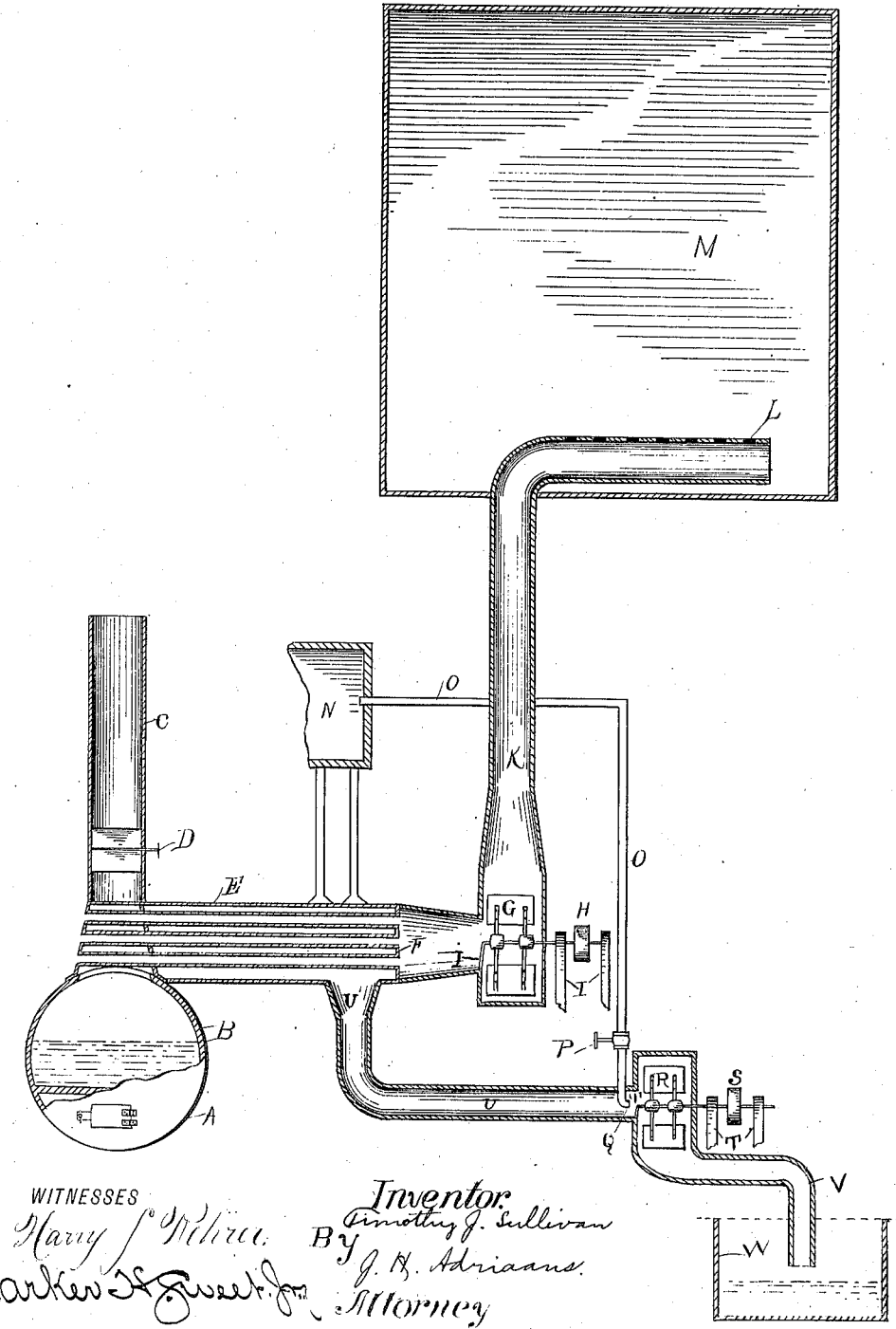

UNITED STATES PATENT OFFICE.

TIMOTHY J. SULLIVAN, OF BOWLING GREEN, KENTUCKY.

ART OF TREATING SMOKE ECONOMICALLY.

SPECIFICATION forming part of Letters Patent No. 335,653, dated February 9, 1886.

Application filed March 3, 1885. Serial No. 157,652. (No model.)

*To all whom it may concern:*

Be it known that I, TIMOTHY J. SULLIVAN, of Bowling Green, in the county of Warren and State of Kentucky, have invented certain new and useful Improvements in Apparatus for Treating Smoke Economically; and I do hereby declare that the following is a full, clear, and exact description thereof, reference being had to the accompanying drawings, and to the letters of reference marked thereon, which form part of this specification.

My invention relates to the art of treating smoke economically; and its objects are, first, to segregate residual carbonaceous matter from smoke; second, to collect and utilize such matter readily; third, to improve contiguous sanitary conditions; and, fourth, simultaneously to apply economically the heated air to useful purposes. I attain these objects by the means illustrated in the accompanying drawings, in which—

Figure 1 is an elevation of the plant essential to the operative embodiment of my principles, showing the correlation and juxtaposition of the elements; and Fig. 2 is a vertical section thereof.

Similar designations refer to corresponding parts in the views.

Over a furnace, A, is mounted a boiler, B, whose generated steam is utilized for the ordinary purposes of the shop or mill. The products of combustion from the furnace A, instead of escaping directly to the atmosphere, as usual, through the stack C, are directed by the damper D into a horizontal passage, E, where they impart their heat to a series of cold-air tubes, F, with which they come in transitory contact, and are thence drawn by the fan R through the pipe U, and forced with increased velocity through the pipe V and discharged into the vessel W with such impact that its contained water absorbs approximately all the solid carbonaceous matter, and the purified products then pass off spontaneously. The tubes F are open at one end to the atmosphere and at the other toward the fan G, and as obviously there can be no intermixture of the smoke with the air, the function of this fan is solely to draw an air-current through the tubes F, which takes up in transit the heat deposited thereon by the products of combustion. The current of the heated air is accelerated in its passage through the pipe K by the action of this fan until it is discharged therefrom into the dry-house M, through the perforations L therein. The fans G R are respectively operated by belts on the pulleys H S, mounted in bearings I I T T. A tank, N, is supported either on the passage E or on the earth, and connects with the casing of the fan R by pipe O, whose contained valve P regulates the flow, and whose terminal sprinkler Q sprays the water sufficiently to cool the passing smoke and cause the deposition of the tarry matters contained therein. The vessel W is usually below the earth, as represented by the dotted line, and contains less water than would cover the end of the pipe V. The vessel W may be tapped for the reclamation of tar and ammonia periodically by evaporation, distillation, or otherwise, and fresh water substituted. It will be noticed that the sequence of the steps employed insures an automatic and desirable operation of the plant, and that the expense of drying lumber and other substances or articles by special devices is saved by increasing the utility of apparatus incident to every mill or dry-house. It will be clear that the heat reclaimed might, with similar effect, be utilized to augment the temperature of apartments, offices, hotels, &c., by obvious mechanical modifications.

Having thus fully described my invention, what I claim, and desire to secure by Letters Patent of the United States, is—

For use in the art of treating smoke economically, the passage E, having a series of tubes in direct atmospheric communication at one end, and at the other end open to the point of utilization, whereon contained heat in the deflected products of combustion from an ordinary furnace is deposited, to be abstracted by the air-current within them, and a superposed tank, N, whose pipe O, discharging near the fan R, sprays water on the smoke to condense the same, in combination with the means, as herein shown and described, for utilizing such heated air, and the devices specified and illustrated for reclaiming residual carbonaceous substances in said smoke.

In testimony that I claim the foregoing as my own I affix my signature in presence of two witnesses.

TIMOTHY J. SULLIVAN.

Witnesses:
 JOHN V. L. PAYNE,
 J. M. TYLER.